United States Patent [19]
Yoshino

[11] 4,322,115
[45] Mar. 30, 1982

[54] DECELERATION-SENSITIVE, LOAD-RESPONSIVE BRAKE PRESSURE CONTROL DEVICE

[76] Inventor: Masato Yoshino, 1, Aza-miyahigashi, Koya, Itami-shi, Hyogo-ken, Japan

[21] Appl. No.: 150,985

[22] Filed: May 19, 1980

[51] Int. Cl.³ .............................................. B60T 8/14
[52] U.S. Cl. .................................... 303/6 C; 188/349; 303/24 A; 303/24 C; 303/22 R
[58] Field of Search ................. 303/6 C, 24 F, 24 A, 303/24 C, 24 R, 22 R; 188/349, 195

[56] References Cited

U.S. PATENT DOCUMENTS

| | | | |
|---|---|---|---|
| 3,169,800 | 2/1965 | Oberthür | 303/6 C X |
| 3,423,936 | 1/1969 | Stelzer | 303/6 C X |
| 3,825,303 | 7/1974 | Yabuta | 303/6 C |
| 3,899,217 | 8/1975 | Ohta | 303/24 C |
| 3,950,037 | 4/1976 | Pembleton et al. | 303/24 F |
| 4,133,584 | 1/1979 | Ohta et al. | 303/6 C |
| 4,253,707 | 3/1981 | Takata | 303/24 A X |

FOREIGN PATENT DOCUMENTS 52-37550 9/1977 Japan .............................. 303/6 C

*Primary Examiner*—Douglas C. Butler
*Attorney, Agent, or Firm*—Wenderoth, Lind & Ponack

[57] ABSTRACT

An improved brake pressure control device is disclosed which has an inertia valve, a sealing chamber, a piston and a pressure proportioning valve. Between the piston and the valve plunger are arranged two springs carried by a U-shaped plate so that the piston will not act on the valve plunger until the pressure in the sealing chamber reaches a predetermined level.

3 Claims, 3 Drawing Figures

DECELERATION-SENSITIVE, LOAD-RESPONSIVE BRAKE PRESSURE CONTROL DEVICE

The present invention relates to a deceleration-sensitive, load-responsive brake pressure control device of the type which detects a predetermined deceleration of the vehicle, seals the fluid pressure upon the occurrence of the deceleration, said fluid pressure depending upon the load of the vehicle, and controls, by means of the sealed pressure, the cut-in point where a pressure proportioning valve starts to operate to reduce the brake pressure for the rear brake.

Among this type of control devices, there are two types: the fixed-deceleration type and the variable-deceleration type. The former type has a simpler design and provides a better cost-to-performance ratio. With the fixed-deceleration type, the sealed pressure is proportional to the gross vehicle weight under the normal operating conditions.

Generally, the ideal ratio of the brake force for the front brakes to that for the rear brakes differs considerably between the unloaded condition and the loaded condition. The cut-in point not only has to be proportional to the sealed pressure, but also it is required that the gradient of the curve of the relationship between the pressure at the cut-in point and the sealed pressure be very steep and spaced from the origin as will be seen in FIG. 3. This fact is known from U.S. Pat. No. 3,825,303, for example.

An object of the present invention is to provide a deceleration-sensitive, load-responsive brake pressure control device having such an amplification function which can be made at a low manufacturing cost and with a high degree of design freedom or flexibility.

Another object of the present invention is to provide a brake pressure control device which has improved sealability of the sealing chamber by means of the inertia ball particularly under the unloaded condition.

Other features and objects of the present invention will become apparent from the following description taken with reference to the accompanying drawings, in which.

Figure 1:
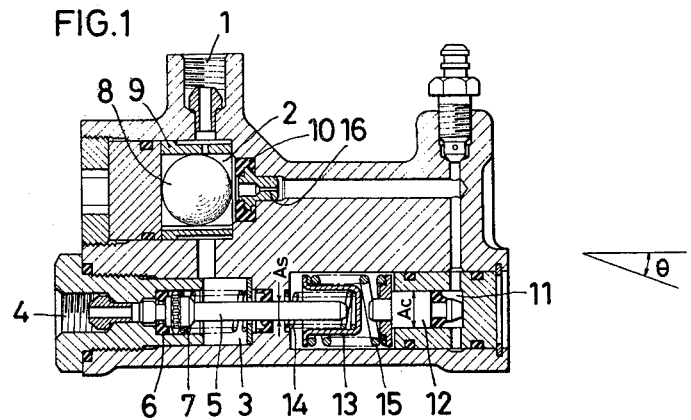
FIG. 1 is a vertical sectional view of the first embodiment of this invention.

Referring to FIG. 1 illustrating the first embodiment of this invention, the fluid under pressure for the rear brake enters the control device according to this invention from an inlet 1, passes through an inertia valve chamber 2 and a valve plunger chamber 3, and leaves the control device from an outlet 4. The plunger chamber houses a pressure proportioning valve comprised of a valve plunger 5, a valve seat 6 and a first spring 7. The valve will not be described in detail because it is known from U.S. Pat. No. 3,423,936.

A ball 8 is arranged in the inertia valve chamber 2, guided by a cage 9. Since the whole control device of this invention is mounted on the vehicle at an angle of $\theta$, the ball 8 is on a slope having such a gradient. The ball 8 cooperates with a valve seat 10 to form an inertia valve. When the rate of deceleration caused by braking exceeds a predetermined value depending upon the mounting angle $\theta$, the ball 8 will roll up the slope rightwardly in the figure until it seats against the valve seat 10 so as to seal the fluid pressure at that point of time into a sealing chamber 11. The sealed-in pressure acts on a piston 12.

A U-shaped plate 13 is arranged between the plunger 5 and the piston 12. The plate 13 is biased by a second spring 14 rightwardly so as to keep the plunger 5 and the plate 13 spaced from each other. A third spring 15 is held between the plate 13 and the piston 12 to bias the plate 13 leftwardly so as to keep the plate and the piston spaced from each other.

The force of the second spring 14 is set so as to be smaller than that of the third spring 15. Therefore, when the pressure in the sealing chamber increases to cause the piston 12 to move leftwardly, the second spring 14 is firstly compressed until the plate 13 engages the plunger 5. Further leftward movement of the piston will compress the third spring 15. (Strictly speaking, a slight compression of the third spring begins before the plate 13 engages the plunger 5.)

When the pressure in the sealing chamber increases further, the piston 12 compresses the third spring 15 until the tip of the piston engages the plate 13 which has already engaged the plunger 5 and pushes the plunger directly in a valve-opening direction. At the inlet of the sealing chamber 11 is provided a restricted flow orifice 16.

The arrangement of the plate 13 is such that when it engages the plunger 5, the flange portion at the lefthand end thereof is still spaced from the end wall of the chamber in which the plate and the second and third springs are housed.

Figure 2:
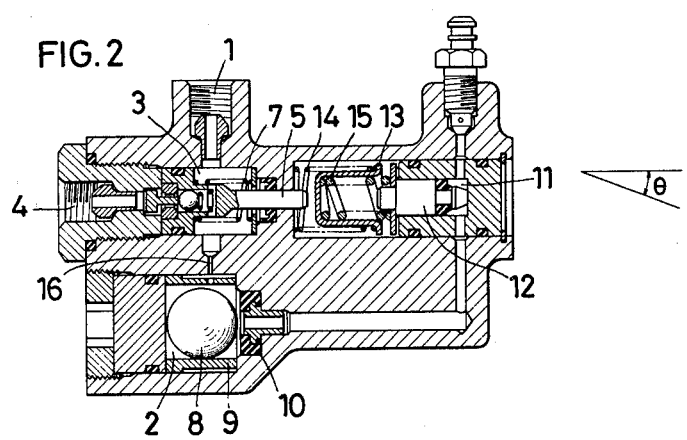
FIG. 2 is a similar view of the second embodiment.

Referring next to FIG. 2 illustrating the second embodiment of this invention, it is generally similar to the embodiment of FIG. 1 in operation. The differences between the first embodiment and the second embodiment will be described below. Firstly, the fluid under pressure goes through the plunger chamber 3 to the inertia valve chamber 2 instead of passing through the inertia valve chamber 2 to the plunger chamber 3 as in the first embodiment. Secondly, the pressure proportioning valve is not the same type used in the first embodiment but a type as disclosed in U.S. Pat. No. 3,169,800. Thirdly, the second spring 14 is disposed outside of the third spring 15, carried by the U-shaped plate 13 on its flange, instead of inside of the third spring 15 as in the first embodiment. Fourthly, a restricted flow orifice 16 is provided at the inlet to the inertia valve chamber 2 instead of at the inlet to the sealing chamber 11 as in the first embodiment.

The operation of the control device according to this invention will be described below.

In the equations that follow, the following designations are used:

As: Effective cross-sectional area of the plunger 5
Ac: Effective cross-sectional area of the piston 12
F1: Force of the first spring 7 with the plunger 5 in its operative position where the communication between the plunger chamber 3 and the outlet 4 is broken.
F2: Force of the second spring 14 with the plate 13 abutting the plunger 5
F3: Force of the third spring 15 with the piston abutting the plate 13 which has abutted the plunger 5
Pc: Pressure sealed in the sealing chamber 11
Ps: Pressure at the cut-in point where the pressure proportioning valve starts to operate to reduce the brake pressure At the initial stage of braking, $$P_s A_s = F_1$$

Thus, $$P_s = \frac{F_1}{A_s} \quad (1)$$

Figure 3:
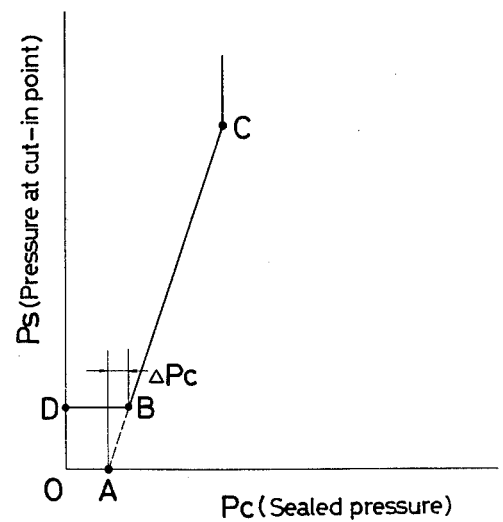
FIG. 3 is a graph showing a characteristic curve of the control device according to this invention.

This stage corresponds to the portion D - B on the performance curve on the graph of FIG. 3.

As the sealed-in pressure increases, the plate 13 is urged toward the plunger 5. After the plate has butted the plunger, the following equation holds.

$$P_s A_s = F_1 - F_2 + P_c A_c$$

thus, $$P_s = \frac{A_c}{A_s}\left(P_c - \frac{F_2 - F_1}{A_c}\right) \quad (2)$$

This stage corresponds to the portions B—C on the performance curve on the graph of FIG. 3.

The imaginary sealed-in pressure Pc at point A on the graph of FIG. 3 is expressed by $$\frac{F_2 - F_1}{A_c}$$

in the equation (2). The gradient of the curve up to point C is expressed by Ac/As which is the ratio between the effective cross-sectional areas. The sealed-in pressure Pc at point B is expressed by $F_2/A_c$ and the pressure Ps at the cut-in point is expressed by $F_1/A_s$ as in the equation (1).

When the sealed-in pressure increases further, the piston 12 engages the plate 13 which has already abutted the plunger 5. The plunger is now prevented from moving rightwardly any more so that the valve comprised of the valve seat 6 and the plunger 5 will be kept open without performing any pressure reducing function. In other words, the cut-in point will be indefinitely high. The sealed-in pressure at the point where the valve stops functioning to reduce the brake pressure is expressed by $F_3/A_c$ and that point corresponds to point C on the graph of FIG. 3.

We shall describe how we have reached to the arrangement of the present invention.

First, if the performance curve in FIG. 3 were through the points A—B—C, not the points D—B—C, the brake output for the rear brake would be zero when the sealed-in pressure Pc is zero. When the vehicle runs down a steep slope, the ball 8 can roll forwardly to close the inertia valve before the brake pedal has been actuated. In such a case, since no pressure is sealed in the sealing chamber, the control valve comprised of the plunger 5 and the seat 6 operates at full effect to reduce the brake pressure. Therefore, the braking pressure for the rear brake can be dangerously low. In order to avoid this and to guarantee a certain amount of minimum brake pressure in any case, the performance curve must be not on the line A—B—C, but on the line D—B—C on the graph of FIG. 3. In order to guarantee the minimum brake pressure, it is required that the first spring 7 urge the plunger 5 in a direction opposite to the direction in which the second spring 14 acts.

In the equation (2), $F_2$ has to be larger than $F_1$ in order that the imaginary point A will be to the right of the origin. This requires that the second spring not act on the plunger until the sealed-in pressure Pc has increased up to a certain value, that is point B on the graph of FIG. 3.

Next, it will be described why the third spring is needed. To carry out what is called the pressure proportioning function, the plunger 5 has to shift or vibrate to and fro through a very small stroke to open and close the fluid path formed between the seat 6 and the shoulder on the plunger 5. This requires that the piston be elastically coupled to the plunger or some buffer means such as a buffer piston be provided in the piston chamber as disclosed in Japan Patent Publication 52-37550, for example. According to the present invention, a third spring is arranged between the plate 13 and the piston 12 so as to carry out such a buffer action, thereby eliminating the need of a buffer piston. The force of the third spring has to be such that it will continue to function up to the upper limit (that is, point C on the graph of FIG. 3) of the range where the pressure proportioning action is required.

So long as the requirement for the spring force is met, the arrangement of the second and third springs may be reversed as in the second embodiment of FIG. 2 or they may have the same diameter and be arranged in series.

In the operation of the control devices of this type in which an inertia ball rolls moving in response to deceleration seats in the valve seat so as to shut off the sealing chamber, if the sealing chamber were rigid under the sealed pressure at that point of time, it would be very difficult to shut off or close the chamber. In contrast, if the piston is in the process of movement under the sealed-in pressure, it is easier to shut off the sealing chamber. In the arrangement of the present invention, as the sealed-in pressure increases, the piston 12 moves leftwardly while compressing the second and third springs and urging the plate 13 toward the plunger 5 until the plate abuts the plunger. Thus, the piston is already in the process of movement before the point B on the graph has been reached. Therefore, the ball can shut the sealing chamber relatively easily. This is advantageous over an arrangement of that type in which the piston does not start to move until the point B is reached (as disclosed in U.S. Pat. No. 3,825,303, for example). In such a device, the shut-off performance in the neighborhood of point B (corresponding to the unloaded condition) is poor so that the sealed pressure is likely to become excessive.

This initial movement of the piston is also advantageous in assuring the effect of the restricted flow orifice particularly when the sealed-in pressure is low, i.e. around the point B on FIG. 3. This is because some amount of fluid flow through the orifice is necessary before the orifice acts to delay the pressure transfer across the orifice. The arrangement according to the present invention provides such a fluid flow before the sealed-in pressure reaches point B in FIG. 3.

For these two reasons, the present invention greatly improves the performance of the control valve particularly when the vehicle is unloaded.

In accordance with the present invention, the design and manufacture of the springs are easier than in the prior art control devices because the requirement for accuracy of spring constants is not so rigid. In prior art arrangements (as disclosed in U.S. Pat. No. 3,825,303) using two springs having a large spring constant ratio, the spring having a smaller spring constant must have a relatively large size. This imposes some restriction on the production. For example, the housing must be made in two sections. This increases the manufacturing cost. In such type of control device, the control accuracy also depends upon the accuracy of the spring constant of the springs used.

Because the control device according to this invention has a simple design and allows the spring constants to be set at relatively high values, it is compact, lightweight and highly accurate. The accuracy does not depend upon the manufacturing accuracy of the spring constant.

What I claim:

1. A deceleration-sensitive, load-responsive brake pressure control device for a vehicle comprising;
   a brake pressure control valve comprising a valve seat and a plunger;
   a sealing chamber;
   an inertia body chamber having a passage means therefrom into said sealing chamber;
   a piston means controlled by the pressure in said sealing chamber and movable toward said plunger for actuating said plunger in response to the pressure in said sealing chamber;
   an inertia body movable in said inertia body chamber in response to the deceleration of the vehicle for closing said passage means to said sealing chamber;
   a first spring engaging said plunger for urging said plunger in the valve opening direction;
   a plate member disposed between said plunger and said piston means and normally spaced from said plunger;
   a second spring engaging said plate member for urging said plate member away from said plunger;
   a third spring between said piston means and said plate member urging said piston means and said plate member away from each other;
   said second spring having a larger spring constant than said first spring and a smaller spring constant than said third spring and said second spring being arranged outside of said third spring and having a larger coil diameter than said third spring, and restricted flow orifice means for retarding the pressure build-up in said sealing chamber;
   whereby, as the pressure in said sealing chamber increases, said piston means compresses said second spring through said third spring until said plate member abuts the plunger and then compresses said third spring until the piston means abuts the plate member which has already abutted the plunger so that the piston means urges the plunger directly in the valve opening direction.

2. A deceleration-sensitive, load-responsive brake pressure control device for a vehicle as claimed in claim 1 wherein said restricted flow orifice means is disposed in said passage means.

3. A deceleration-sensitive, load-responsive brake pressure control device for a vehicle as claimed in claim 1 wherein said restricted flow orifice means is disposed in the inlet to said inertia body chamber.

* * * * *